(12) United States Patent
Han et al.

(10) Patent No.: US 8,139,643 B2
(45) Date of Patent: Mar. 20, 2012

(54) MOTION ESTIMATION APPARATUS AND METHOD FOR MOVING PICTURE CODING

(75) Inventors: Jin Ho Han, Seoul (KR); Suk Ho Lee, Daejeon (KR); Seong Mo Park, Daejeon (KR); Nak Woong Eum, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 888 days.

(21) Appl. No.: 12/191,733

(22) Filed: Aug. 14, 2008

(65) Prior Publication Data

US 2009/0154564 A1 Jun. 18, 2009

(30) Foreign Application Priority Data

Dec. 17, 2007 (KR) .................. 10-2007-0132665

(51) Int. Cl.
*H04B 1/66* (2006.01)
(52) U.S. Cl. .................. 375/240.16; 375/240.12
(58) Field of Classification Search .................. None
See application file for complete search history.

(56) References Cited

U.S. PATENT DOCUMENTS

| | | | |
|---|---|---|---|
| 5,594,813 A | 1/1997 | Fandrianto et al. | |
| 6,674,798 B2 * | 1/2004 | Ishihara et al. | 375/240.16 |
| 7,653,132 B2 * | 1/2010 | Dang | 375/240.12 |
| 2007/0291846 A1 * | 12/2007 | Hussain | 375/240.16 |
| 2008/0260023 A1 * | 10/2008 | Sung | 375/240.03 |

FOREIGN PATENT DOCUMENTS

| | | |
|---|---|---|
| EP | 1431917 A2 | 6/2004 |
| EP | 1653744 A1 | 5/2006 |

(Continued)

OTHER PUBLICATIONS

Im, Hyunchang et al., "Implementation of an H.264 Motion Estimation on a VLIW Programmable Digital Signal Processor", IEEE Workshop on Signal Processing Systems Design and Implementation, Athens, Greece, Nov. 2, 2005, pp. 302-306.
Yang, Chunlei et al., "A New Architecture for H.264 Variable Block Size Motion Estimation", Circuits and Systems, 49th IEEE International Midwest Symposium, 2006, pp. 132-136.

*Primary Examiner* — Phirin Sam
(74) *Attorney, Agent, or Firm* — Rabin & Berdo, P.C.

(57) ABSTRACT

Provided is a motion estimation apparatus for moving picture coding. The apparatus includes a 1-pel buffer for storing 1-pel unit pixels using luminance signals of a reference frame which correspond to macroblocks of a current frame, a 1-pel estimator for calculating 1-pel unit motion vectors and minimum costs in correspondence to the macroblocks of the current frame and the pixels stored in the 1-pel buffer, a ½-pel interpolator for performing ½-pel unit interpolation using the pixels stored in the 1-pel buffer, a ½-pel buffer for storing the ½-pel unit interpolated pixels, a ½-pel estimator for calculating ½-pel unit motion vectors and minimum costs in correspondence to the pixels stored in the ½-pel buffer, the values calculated by the 1-pel estimator, and the macroblocks of the current frame, a ¼-pel interpolator for performing ¼-pel unit interpolation using the pixels stored in the ½-pel and 1-pel buffers, a ¼-pel buffer for storing the ¼-pel unit interpolated pixels, and a ¼-pel estimator for calculating ¼-pel unit motion vectors and minimum costs in correspondence to the pixels stored in the ¼-pel buffer, the values calculated by the ½-pel estimator, and the macroblocks of the current frame.

14 Claims, 9 Drawing Sheets

FOREIGN PATENT DOCUMENTS

| KR | 10-2005-0097386 | 10/2005 |
| KR | 10-2007-0059785 | 6/2007 |
| KR | 10-2007-0061214 | 6/2007 |
| WO | WO-2005/110049 | 11/2005 |

* cited by examiner

| A | | | B | | | C | | | D | | | E |
|---|---|---|---|---|---|---|---|---|---|---|---|---|
| | 1 | 5 | 49 | | 2 | 6 | 50 | | 3 | 7 | 51 | | 4 | 8 | 52 | |
| | 9 | a | 53 | b | 10 | c | 54 | d | 11 | e | 55 | f | 12 | g | 56 | h |
| | 57 | 61 | 65 | | 58 | 62 | 66 | | 59 | 63 | 67 | | 60 | 64 | 68 | |
| F | | i | | G | | j | | H | | k | | I | | l | | J |
| | 13 | 17 | 69 | | 14 | 18 | 70 | | 15 | 19 | 71 | | 16 | 20 | 72 | |
| | 21 | m | 73 | n | 22 | o | 74 | p | 23 | q | 75 | r | 24 | s | 76 | t |
| | 77 | 81 | 85 | | 78 | 82 | 86 | | 79 | 83 | 87 | | 80 | 84 | 88 | |
| K | | u | | L | | v | | M | | w | | N | | x | | O |
| | 25 | 29 | 89 | | 14 | 30 | 90 | | 15 | 31 | 91 | | 16 | 32 | 92 | |
| | 33 | y | 93 | z | 34 | aa | 94 | bb | 35 | cc | 95 | dd | 36 | ee | 96 | ff |
| | 97 | 101 | 105 | | 98 | 102 | 106 | | 99 | 103 | 107 | | 100 | 104 | 108 | |
| P | | gg | | Q | | hh | | R | | ii | | S | | jj | | T |
| | 37 | 41 | 109 | | 38 | 42 | 110 | | 39 | 43 | 111 | | 40 | 44 | 112 | |
| kk | 45 | ll | 113 | mm | 46 | nn | 114 | oo | 47 | pp | 115 | qq | 48 | rr | 116 | ss |
| | 117 | 121 | 125 | | 118 | 122 | 126 | | 119 | 123 | 127 | | 120 | 124 | 128 | |
| U | | tt | | V | | uu | | W | | vv | | X | | ww | | Y |

FIG. 8

|   |   |   |   |   |   |   |   |
|---|---|---|---|---|---|---|---|
| A | B | C | D | E |   |   |   |
| F | G | H | I | J |   |   |   |
| K | L | M | N | O |   |   |   |
| P | Q | R | S | T |   |   |   |
| U | V | W | X | Y |   |   |   |
|   |   |   |   |   |   |   |   |

FIG. 9

| a | c | e | g | | | | |
|---|---|---|---|---|---|---|---|
| m | o | q | s | | | | |
| y | aa | cc | ee | | | | |
| ll | nn | pp | rr | | | | |
| | | | | | | | |

| b | d | f | h | | | | |
|---|---|---|---|---|---|---|---|
| n | p | r | t | | | | |
| z | bb | dd | ff | | | | |
| mm | oo | qq | ss | | | | |
| | | | | | | | |

| i | j | k | l | | | | |
|---|---|---|---|---|---|---|---|
| u | v | w | x | | | | |
| gg | hh | ii | jj | | | | |
| tt | uu | vv | ww | | | | |
| | | | | | | | |

FIG. 10

| 1 | 2 | 3 | 4 |
|---|---|---|---|
| 13 | 14 | 15 | 16 |
| 25 | 26 | 27 | 28 |
| 37 | 38 | 39 | 40 |

| 5 | 6 | 7 | 8 |
|---|---|---|---|
| 17 | 18 | 19 | 20 |
| 29 | 30 | 31 | 32 |
| 41 | 42 | 43 | 44 |

| 49 | 50 | 51 | 52 |
|----|----|----|----|
| 69 | 70 | 71 | 72 |
| 89 | 90 | 91 | 92 |
| 109 | 110 | 111 | 112 |

| 9 | 10 | 11 | 12 |
|---|----|----|----|
| 21 | 22 | 23 | 24 |
| 33 | 34 | 35 | 36 |
| 45 | 46 | 47 | 48 |

| 53 | 54 | 55 | 56 |
|----|----|----|----|
| 73 | 74 | 75 | 76 |
| 93 | 94 | 95 | 96 |
| 113 | 114 | 115 | 116 |

| 57 | 58 | 59 | 60 |
|----|----|----|----|
| 77 | 78 | 79 | 80 |
| 97 | 98 | 99 | 100 |
| 117 | 118 | 119 | 120 |

| 61 | 62 | 63 | 64 |
|----|----|----|----|
| 81 | 82 | 83 | 84 |
| 101 | 102 | 103 | 104 |
| 121 | 122 | 123 | 124 |

| 65 | 66 | 67 | 68 |
|----|----|----|----|
| 85 | 86 | 87 | 88 |
| 105 | 106 | 107 | 108 |
| 125 | 126 | 127 | 128 |

MOTION ESTIMATION APPARATUS AND METHOD FOR MOVING PICTURE CODING

CROSS-REFERENCE TO RELATED APPLICATION

This application claims priority to and the benefit of Korean Patent Application No. 2007-132665, filed Dec. 17, 2007, the disclosure of which is incorporated herein by reference in its entirety.

BACKGROUND

1. Field of the Invention

The present invention relates to a motion estimation apparatus and method for moving picture coding and, more particularly, to a motion estimation apparatus and method for efficiently operating a processor in order to conduct moving picture coding based on H.264.

This work was supported by the IT R&D program of MIC/IITA [2007-S026-01, Multi-Format Multimedia SoC based on MPcore Platform].

2. Discussion of Related Art

The international organizations for video coding standards, International Telecommunication Union Telecommunication Standardization Sector (ITU-T) and International Standards Organization (ISO), jointly construct the joint video team (JVT) to issue H.264, which is a standard for video compression. Like known video coding systems, the standard H.264 performs motion estimation on a previous frame that has already been encoded, thereby forming an estimation signal. Further, the standard H.264 mixes motion compensation with discrete cosine transform (DCT), thereby forming an estimation error signal. Here, the standard H.264 conducts the motion estimation up to 4×4 block size, which is smaller than that used in the known coding systems, in order to enhance compression capability, and the motion compensation up to a ¼-pel unit. The video coding standard H.264 based on these technologies has twice as high compression capability as a known video coding standard, Moving Picture Experts Group-4 Advanced Simple Profile (MPEG-4 ASP), has. Accordingly, in the case of the standard H.264, its applications are expected as critical technology to be used for a variety of multimedia communication services. Further, researches for improving technology and capability of compressing video data using an H.264 video codec are actively made.

However, the video codec technology based on the standard H.264 requires wide memory bandwidth and high design complexity when realized, so that it has difficulty in becoming a real-time application. Particularly, since the motion estimation based on the ¼-pel unit is more complicated than that based on the ½-pel unit, efficient pixel interpolation and motion estimation are required.

SUMMARY OF THE INVENTION

The present invention is directed to a motion estimation apparatus and method for moving picture coding.

The present invention is also directed to a motion estimation apparatus and method for moving picture coding, which is capable of conducting 1-pel unit, ½-pel unit and ¼-pel unit motion estimation in a design considering a hierarchical motion estimation algorithm when a motion estimation is conducted using ¼-pel unit interpolated pixels in the event of moving picture coding based on H.264, and efficient moving picture coding for the motion estimation.

An aspect of the present invention is to provide a motion estimation apparatus for moving picture coding comprising: a 1-pel buffer for storing 1-pel unit pixels using luminance signals of a reference frame which correspond to macroblocks of a current frame; a 1-pel estimator for calculating 1-pel unit motion vectors and minimum costs in correspondence to the macroblocks of the current frame and the pixels stored in the 1-pel buffer; a ½-pel interpolator for performing ½-pel unit interpolation using the pixels stored in the 1-pel buffer; a ½-pel buffer for storing the ½-pel unit interpolated pixels; a ½-pel estimator for calculating ½-pel unit motion vectors and minimum costs in correspondence to the pixels stored in the ½-pel buffer, the values calculated by the 1-pel estimator, and the macroblocks of the current frame; a ¼-pel interpolator for performing ¼-pel unit interpolation using the pixels stored in the ½-pel and 1-pel buffers; a ¼-pel buffer for storing the ¼-pel unit interpolated pixels; and a ¼-pel estimator for calculating ¼-pel unit motion vectors and minimum costs in correspondence to the pixels stored in the ¼-pel buffer, the values calculated by the ½-pel estimator, and the macroblocks of the current frame.

Here, the 1-pel buffer includes a physical single memory, which stores 24×24 pixels. Further, the ½-pel buffer includes physically separated three memories, which store 17×16, 16×17 and 17×17 pixels, respectively, and stores the ½-pel unit interpolated pixels among the pixels included in the 1-pel buffer in correspondence to the motion vectors determined by the 1-pel estimator.

Also, the ½-pel buffer includes physically separated three memories, and stores the ½-pel unit interpolated pixels among the pixels included in the 1-pel buffer in correspondence to the motion vectors determined by the 1-pel estimator. Further the ½-pel unit interpolated pixels are located on a search window from locations shifted by a ½-pel unit in a leftward direction, by the ½-pel unit in an upward direction, and by the ½-pel unit in leftward and upward directions with reference to the motion vectors determined by the 1-pel estimator at 1-pel unit intervals, and each number 17×16, 16×17 and 17×17.

Further, the three memories include: the memory that stores the 17×16 pixels from the locations shifted by the ½-pel unit in the leftward direction with reference to pixels at which the motion vectors determined by the 1-pel estimator are occupied on the search window; the memory that stores the 16×17 pixels from the locations shifted by the ½-pel unit in the upward direction with reference to pixels at which the motion vectors determined by the 1-pel estimator are occupied on the search window; and the memory that stores the 17×17 pixels from the locations shifted by the ½-pel unit in the leftward and upward directions on with reference to pixels at which the motion vectors determined by the 1-pel estimator are occupied on the search window;

In addition, the ¼-pel buffer includes physically separated eight memories which store the 16×16 pixels, respectively, and stores the ¼-pel unit interpolated pixels among the pixels included in the ½-pel buffer in correspondence to the motion vectors determined by the ½-pel estimator.

Further, the ¼-pel unit interpolated pixels are located on a search window at 1-pel unit intervals from contoured eight pixels included in a 3×3 block with reference to pixels at which the motion vectors determined by the ½-pel estimator are occupied on the search window, and each number 16×16.

Also, each of the eight memories stores 16×16 pixels from contoured eight locations included in a 3×3 block set with reference to pixels at which the motion vectors determined by the ½-pel estimator are occupied on the search window, and stores values of the pixels calculated from one of the contoured eight locations.

Another aspect of the present invention is to provide motion estimation method for moving picture coding comprising: storing 1-pel unit pixels using luminance signals of a reference frame which correspond to macroblocks of a current frame; calculating 1-pel unit motion vectors and minimum costs in correspondence to the stored 1-pel unit pixels and the macroblocks of the current frame; performing ½-pel unit interpolation using the 1-pel unit pixels; storing the ½-pel unit interpolated pixels; calculating ½-pel unit motion vectors and minimum costs in correspondence to the ½-pel unit interpolated pixels, the values of the 1-pel unit motion vectors and minimum costs calculated based on the 1-pel unit, and the macroblocks of the current frame; performing ¼-pel unit interpolation using the ½-pel unit interpolated pixels; storing the ¼-pel unit interpolated pixels; and calculating ¼-pel unit motion vectors and minimum costs in correspondence to the ¼-pel unit interpolated pixels, the values of the ½-pel unit motion vectors and minimum costs calculated based on the ½-pel unit, and the macroblocks of the current frame.

Here, the ½-pel unit interpolated pixels are located on a search window from locations shifted by a ½-pel unit in a leftward direction, by the ½-pel unit in an upward direction, and by the ½-pel unit in leftward and upward directions with reference to the motion vectors determined by the 1-pel estimator at 1-pel unit intervals, and each number 17×16, 16×17 and 17×17.

Further, the ¼-pel unit interpolated pixels are located on a search window at 1-pel unit intervals from contoured eight pixels included in a 3×3 block with reference to pixels at which the motion vectors determined by the ½-pel estimator are occupied on the search window, and each number 16×16.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF EXEMPLARY EMBODIMENTS

Hereinafter, a motion estimation apparatus and method for moving picture coding according to the present invention will be described in detail with reference to the accompanying drawings.

The term "dot" is arbitrarily defined herein. For example, one pixel of a macroblock is defined as four dots. In other words, the four dots constitute one pixel.

Figure 1:
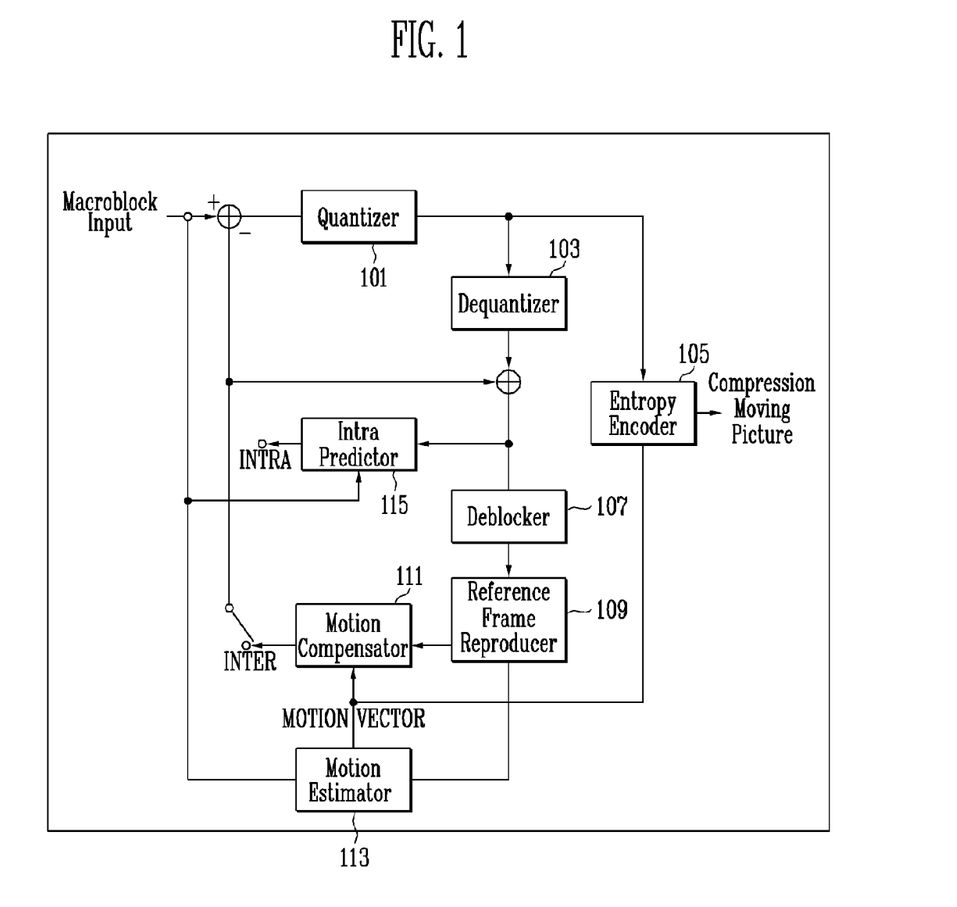
FIG. 1 illustrates entire configuration of a H.264 encoder to which the present invention is applied.

FIG. 1 illustrates entire configuration of a H.264 encoder to which the present invention is applied.

Referring to FIG. 1, the H.264 encoder comprises a quantizer 101, dequantizer 103, an entropy encoder 105, a deblocker 107, a reference frame reproducer 109, a motion compensator 111, a motion estimator 113, and an intra predictor 115.

The quantizer 101 transforms and quantizes a macroblock input from the outside on the basis of a predetermined format. A typical image transform technique of quantizing an image at this quantizer 101 includes discrete cosine transform (DCT).

The dequantizer 103 receives, dequantizes and inverse-transforms data of the transformed and quantized image from the quantizer 101.

The entropy encoder 105 entropy-encodes a final macroblock, which goes through final H.264 coding, to generate an output bit stream.

The deblocker 107 deblocks the dequantized macroblock to provide a natural image.

The reference frame reproducer 109 generates and stores a plurality of reference frames using the image received from the deblocker 107. This reference frame includes a plurality of frame images used as a reference picture in the event of motion estimation or compensation.

The motion compensator 111 compensates for the macroblock on the basis of the reference frame stored in the reference frame reproducer 109, and of a motion vector and a cost estimated by the motion estimator 113.

The motion estimator 113 estimates motion of a current macroblock using the reference frame stored in the reference frame reproducer 109 to calculate the motion vector and the cost. This motion estimator estimates motion up to a ¼-pel unit unlike an existing Moving Picture Experts Group (MPEG) technique. As such, the estimation requires very complicated calculation. In particular, the method of estimating the motion at the motion estimator 113 is a subject matter of the present invention, and thus will be described in greater detail with reference to the other figures.

The intra predictor 115 conducts prediction coding, i.e. intra prediction, in the macroblocks using the previous predicted macroblocks in the current frame.

Figure 2:
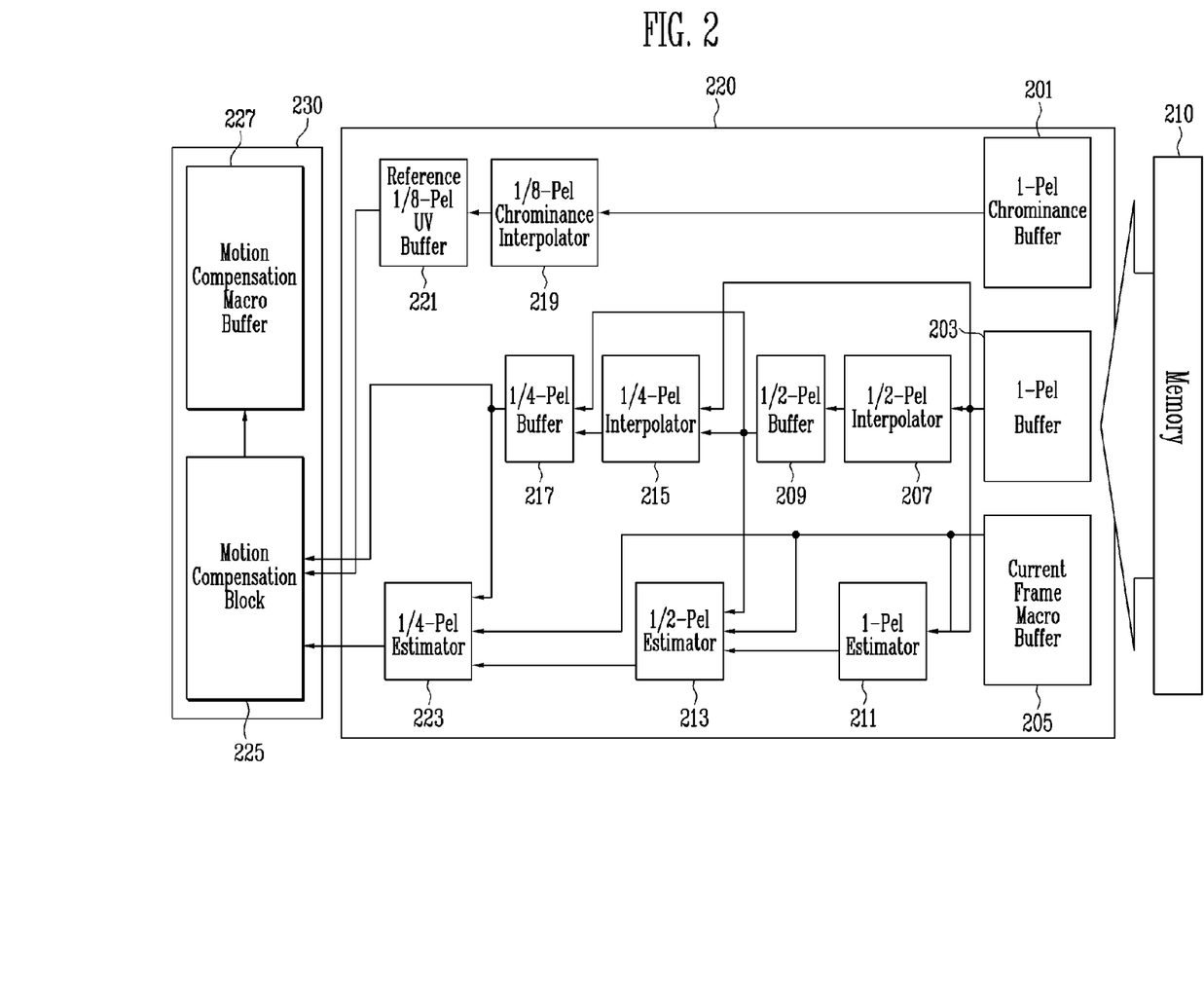
FIG. 2 is a diagram for explaining the structure of a motion estimator according to the present invention.

FIG. 2 is a diagram for explaining the structure of a motion estimator according to the present invention.

Referring to FIG. 2, the motion estimator 220 according to the present invention comprises a 1-pel chrominance buffer 201, a 1-pel buffer 203, a current frame macro buffer 205, a ½-pel interpolator 207, a ½-pel buffer 209, a 1-pel estimator 211, a ½-pel estimator 213, a ¼-pel interpolator 215, a ¼-pel buffer 217, a ¼-pel chrominance interpolator 219, a ¼-pel chrominance buffer 221, and a ¼-pel estimator 223.

The motion estimator 220 receives information on the necessary macroblocks from a memory 210, in which the reference frame included in the reference frame reproducer and the current frame are stored, estimates the motion in the ¼-pel unit, and transmits the motion vector and the cost based on the motion to the motion compensator 230. The motion compensator 230 receiving these values compensates for the motion through its motion compensation block 225, and stores the compensated macroblocks through its motion compensation macro buffer 227.

The 1-pel chrominance buffer 201 of the motion estimator 220 is a buffer that stores, among the macroblocks of the reference frame which correspond to the macroblocks of the current frame intended to compensate for the motion, the macroblocks, in which chrominance values (U, V) are discretely stored, in the unit of one pixel.

The 1-pel buffer 203 stores the macroblocks of the reference frame which correspond to the macroblocks of the current frame intended to compensate for the motion in the unit of one pixel.

The current frame macro buffer 205 is a buffer that stores only values of the macroblocks, which are actually calculated at present, among the pixel values of the current frame stored in the memory 210.

The ½-pel interpolator 207 conducts ½-pel interpolation using 1-pel interpolated values stored in the 1-pel buffer 203. This ½-pel interpolation will be described below in detail.

The ½-pel buffer 209 stores pixel values obtained by the ½-pel interpolation. This ½-pel buffer 209 is physically composed of three memories, to each of which access can be provided at the same time.

The 1-pel estimator 211 estimates the current macroblocks in the unit of one pixel using the values stored in the 1-pel buffer 203 and the current frame macro buffer 205. The 1-pel unit estimation refers to calculating direction and amount of movement of the macroblocks of the reference frame and the current frame in the unit of four dots. Here, the minimum cost and the motion vector are determined.

The ½-pel estimator 213 estimates the current macroblocks in the unit of half pixel using the values stored in the ½-pel buffer 209, the values stored in the current frame macro buffer 205, and the values estimated by the 1-pel estimator 211.

The ¼-pel interpolator 215 conducts ¼-pel interpolation using the ½-pel interpolated values stored in the ½-pel buffer 209. This ¼-pel interpolation will be described below in detail.

The ¼-pel buffer 217 pixel values obtained by the ¼-pel interpolation. This ¼-pel buffer 217 is physically composed of eight memories, to each of which access can be provided at the same time.

The ⅛-pel chrominance interpolator 219 interpolates chrominance pixels in the ⅛-pel unit using the values stored in the 1-pel chrominance buffer 201.

The ⅛-pel chrominance buffer 221 stores the values interpolated by the ⅛-pel chrominance interpolator 219.

The ¼-pel estimator 223 estimates the current macroblocks in the ¼-pel unit using the values stored in the ¼-pel buffer 217, the values estimated by the ½-pel estimator 213, and the values stored in the current frame macro buffer 205.

The motion estimator 220 having this configuration makes estimation calculating more rapid and efficient than directly calculating the estimation values on a search window of the reference frame of the memory, because the 1-pel unit value, the ½-pel unit interpolated value, and the ¼-pel unit interpolated value are stored in respective different buffers step by step, and because each buffer stores the pixels in the unit of 32 bits.

Figure 3:
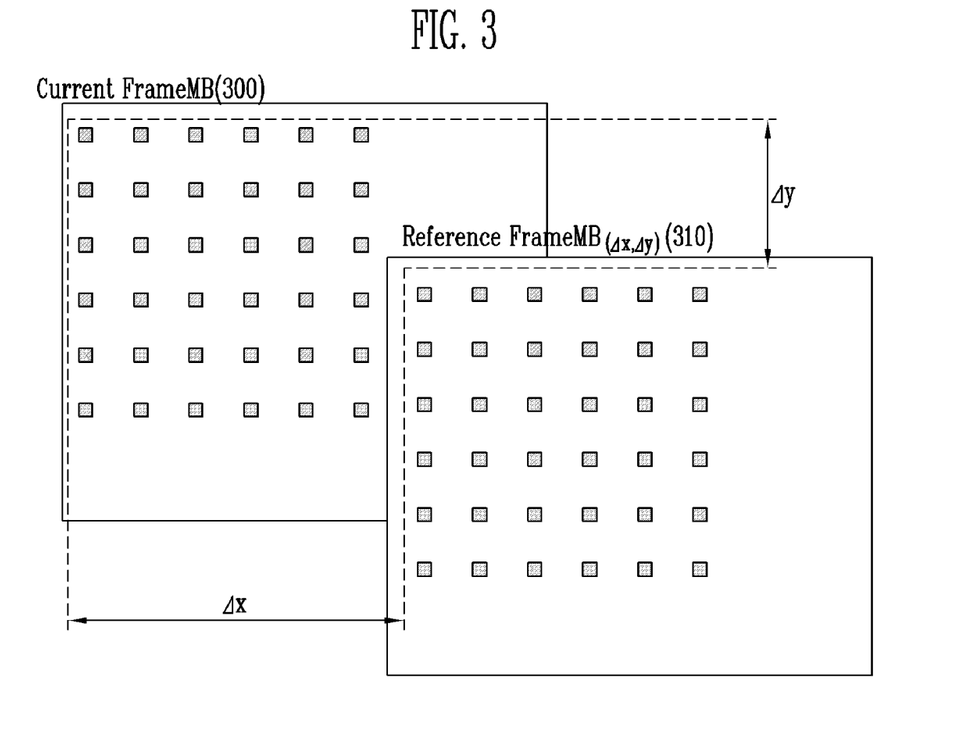
FIG. 3 s a diagram explaining luminance motion estimation to which the present invention is applied.

FIG. 3 is a diagram explaining luminance motion estimation to which the present invention is applied.

Referring to FIG. 3, the luminance motion estimation to which the present invention is applied is based on calculating a motion vector and its cost using a difference value ($\Delta x$, $\Delta y$) between the macroblock 300 of a currently input frame and the macroblock 310 of a reference frame selected from a plurality of past frames. When this motion estimation is possible, both a frame compensating for a motion estimation value and a motion vector denoting a difference value of motion of the frame are transferred. Thereby, a continuous picture can be formed, and thus the magnitude of a moving picture signal can be greatly reduced.

Here, the motion estimation can obtain the sum of absolute values of a difference between pixels of the current frame macroblock 300 and the reference frame macroblock 310, calculate its cost, and define as the motion vector a pixel location ($\Delta x$, $\Delta y$) having the minimum cost with respect to the search window of the reference frame and the current frame macroblock 300.

This motion vector and the cost value can be calculated as follows.

$$\text{Motion Vector} = (\Delta x, \Delta y)_{MinCost}$$

$$MINCOST = \text{MIN}\{\text{Cost}(\Delta x, \Delta y)\}$$

$$\text{Cost}(\Delta x, \Delta y) = \sum_{(x,y)=(0,0)}^{(x,y)=(15,15)} \left| Luma_{(x,y)}^{CurrentFrame} - Luma_{(x+\Delta x, y+\Delta y)}^{Reference\ Frame} \right|$$

where Luma is the abbreviation for luminance.

Figure 4:
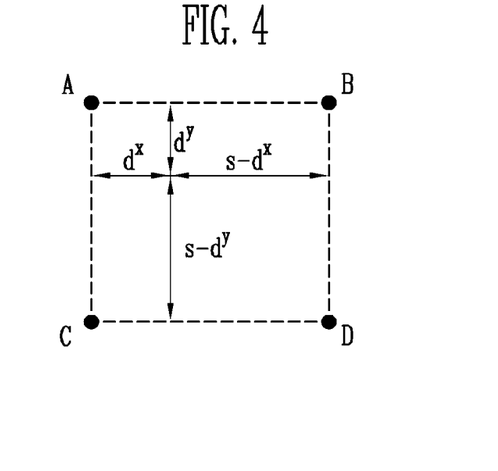
FIG. 4 is a diagram explaining a chrominance interpolation method to which the present invention is applied.

FIG. 4 is a diagram explaining a chrominance motion interpolation method to which the present invention is applied.

Referring to FIG. 4, in the chrominance motion interpolation method to which the present invention is applied, $\alpha$, the pixel interpolated from pixels represented by capitals A, B, C and D can be calculated as follows when it exists at a location a which is shifted from a location A by $d_x$ and $d_y$.

$$\alpha = \{(4-d_x)(4-d_y)A + d_x(4-d_y)B + (4-d_x)d_yC + d_xd_yD + 16\}/32$$

when $A=(x_a, y_a)$, then $\alpha=(x_a+d_x, y_a+d_y)$.

In this manner, the value of a chrominance macroblock can be interpolated based on the values of $d_x$ and $d_y$.

Figure 5:
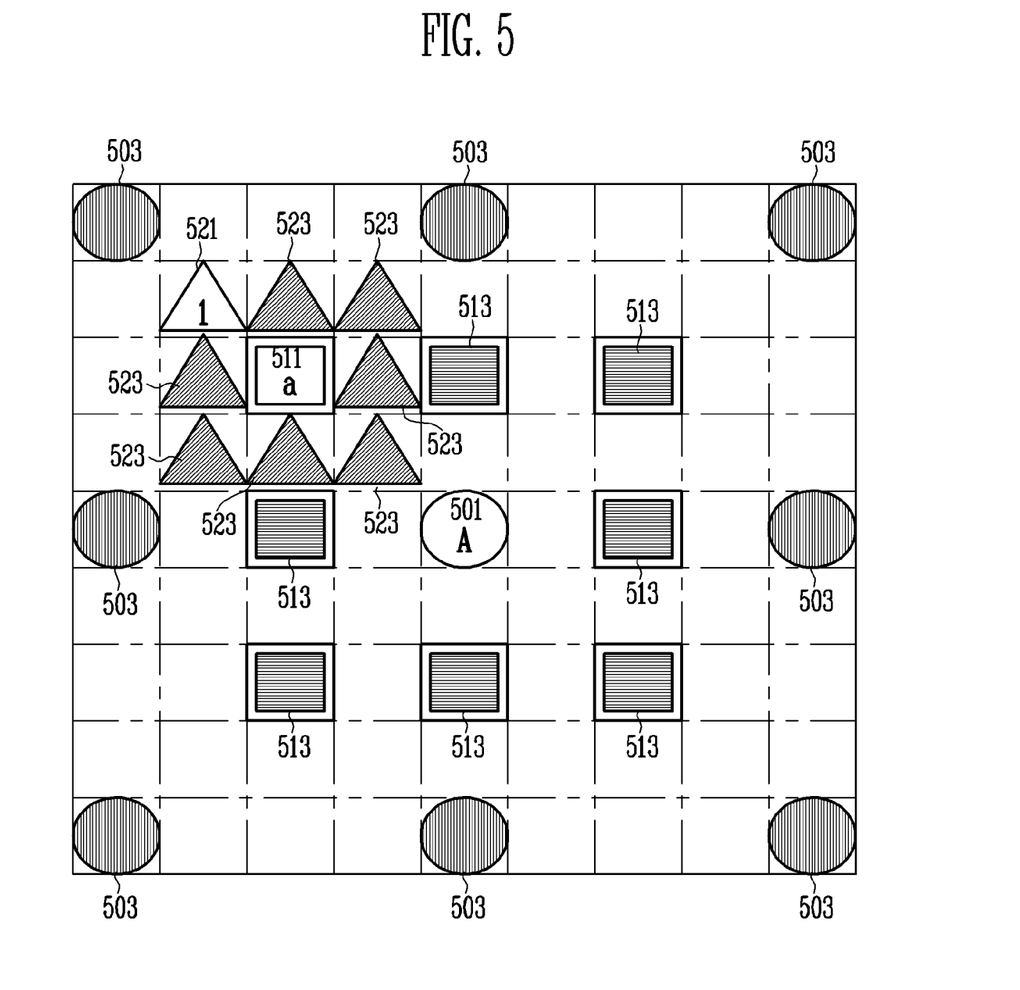
FIG. 5 illustrates the interpolation location of a luminance signal, to which the present invention is applied, on a search window within a reference frame.

FIG. 5 illustrates the interpolation location of a luminance signal, to which the present invention is applied, on a search window within a reference frame.

Referring to FIG. 5, pixel locations 501 and 503 designated in a circle shape denotes 1-pel unit locations in the macroblock of 16×16. As can be seen from FIG. 5, this 1-pel unit value is determined for one per four sub-blocks in the macroblock of the reference frame. At this time, one sub-block in the macroblock will be referred to as one dot.

When one pixel is stored in this way, 1-pel unit motion is estimated using a value of the stored pixel. Then, a motion vector is determined.

Assuming that the motion vector determined in this way is A or 501, ½-pel unit interpolation is adapted so that eight locations 511 and 513 in a 5×5 block spaced apart from the pixel location A or 501 in the macroblock in the unit of half pixel, i.e. two dots, are designated as candidate motion vectors for ½-pel unit motion estimation.

A luminance value of each location set in this way is as follows when expressed by b.

$$b = (E - 5 \times F + 20 \times G + 20 \times H + 5 \times I + J + 16)/32$$

Here, E, F, G, H, I and J are the 1-pel unit luminance values arranged in a horizontal direction. Thus, the value b is calculated as the ½-pel unit luminance value between G and H.

The luminance value interpolated in the unit of half pixel by this calculation is applied to the location 513 and 511. Thus, when ½-pel unit motion estimation is conducted using this interpolated value, one of the eight values is set as the motion vector. This will be described as one example.

If the motion vector set in this way is a or 511, ¼-pel unit interpolation is adapted so that eight locations 521 and 523 in a 3×3 block spaced apart from the pixel location a or 511 in the macroblock in the ¼-pel unit, i.e. one dot, are designated as candidate motion vectors for ¼-pel unit motion estimation.

A value of the location designated in this way is as follows.

$$a=(G+b+1)/2$$

Here, a is the ¼-pel unit luminance value between G and b, where G is a 1-pixel interpolated value, and b is a ½-pel interpolated value.

Figure 6:
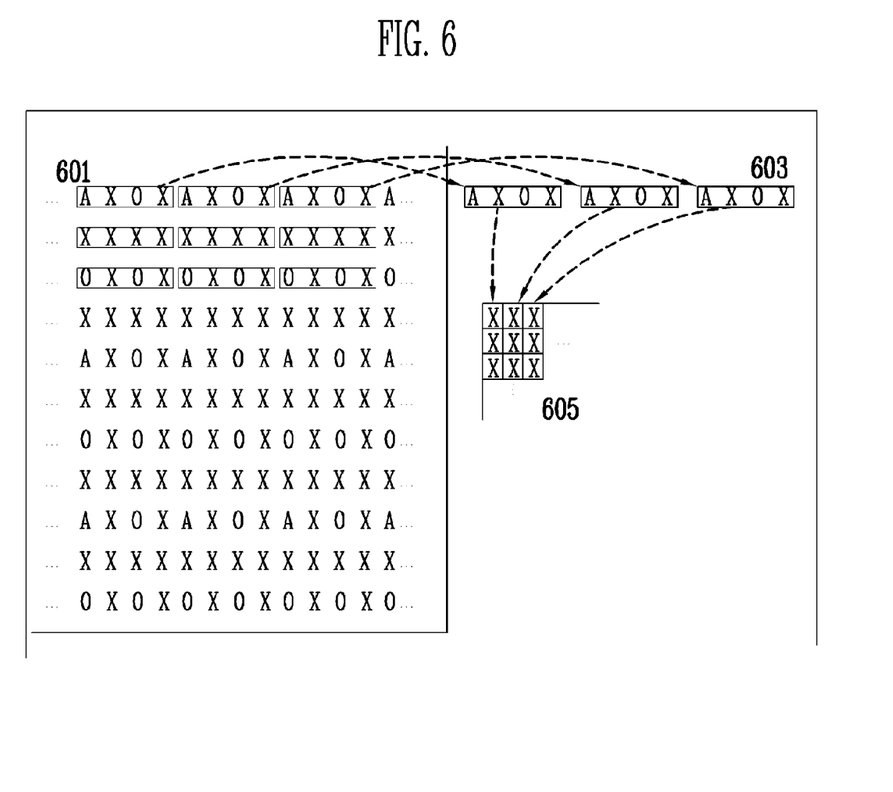
FIG. 6 illustrates a process of calculating an interpolated value of a luminance signal to which the present invention is applied.

FIG. 6 illustrates a process of calculating the interpolated value of a luminance signal to which the present invention is applied.

Referring to FIG. 6, it can be seen from the description of FIG. 5 that one pixel is read and stored in the unit of four dots when each interpolated value is calculated.

For example, in the case of the 1-pixel unit, one pixel per four dots is selected and set from the reference frame macroblock, and the set value is identically used for the ½-pel unit interpolation.

In this case, the memory in which the reference frame is stored has a memory map as indicated by a reference number 601. In other words, different values are set in the unit of dot. In this case, the memory is operated in a general 32-bit environment, so that the luminance value of each dot has an 8-bit value. Thus, four dots are obtained from each process.

In the case where the ½-pel unit interpolation is conducted in the memory 601, every four dot values of the memory 601 are read as in a mode indicated by a reference number 603, so that the value of a one-pixel unit is read. Then, the ½-pel unit interpolation is conducted using the read value. In detail, according to the numerical formula associated with FIG. 5, first, the E, F, G, H, I and J values must be obtained in order to determined the b value. To this end, reading is required once for the E value, and twice for the F value. Thus, the processor requires six operations in total.

However, according to the present invention, in the case where 1-pixel unit interpolation is conducted, the interpolated values are collected in the unit of four dots, that is the unit operation of the processor, and then are stored in the buffer 605. If these intermediate values are separately stored in the buffer, the E, F, G, H, I and J values are determined by reading them twice when the next ½-pel unit interpolation is conducted. Further, in the case where one-pixel unit estimation is conducted, the difference value (Δx, Δy) must also be calculated in the unit of four dots. Even in this case, the calculation is by far efficiently is carried out using such a buffer.

Figure 7:
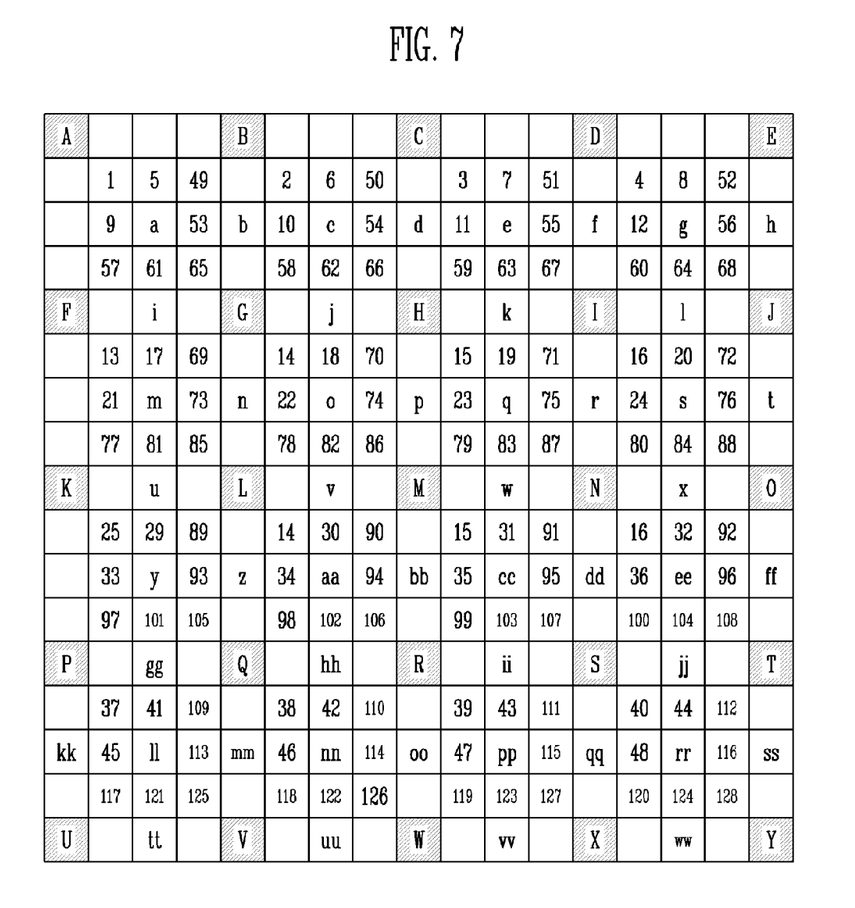
FIG. 7 illustrates part of the search window of a reference frame, which completes ¼-pel interpolation and is stored in a reference frame reproducer, according to an embodiment of the present invention.

FIG. 7 illustrates part of the search window of a reference frame, which completes ¼-pel unit interpolation and is stored in a reference frame reproducer, according to an embodiment of the present invention.

Figure 8:
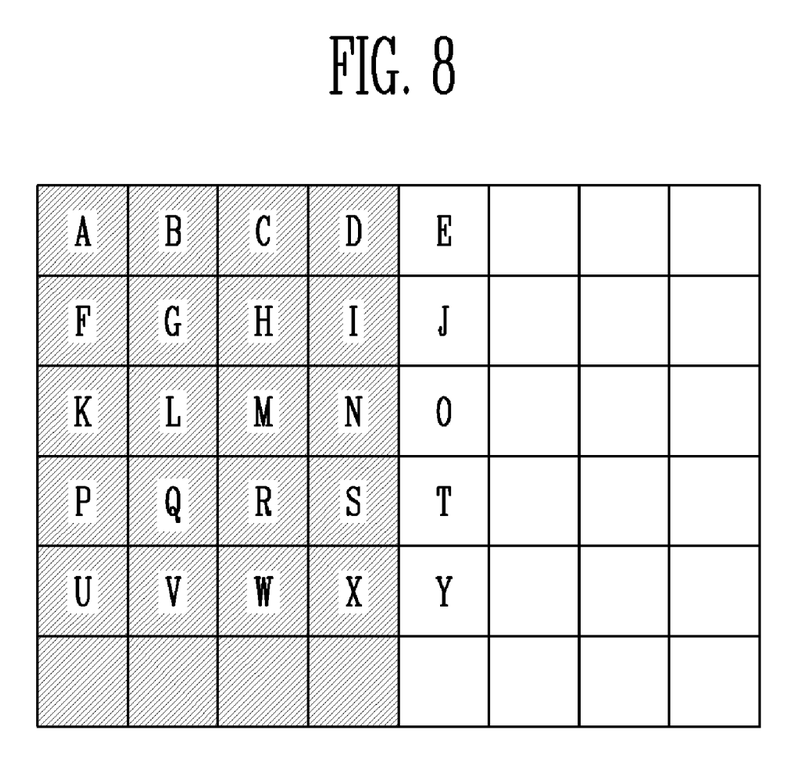
FIG. 8 illustrates the memory map of a buffer in which 1-pel unit values are stored according to an embodiment of the present invention.
Figure 9:
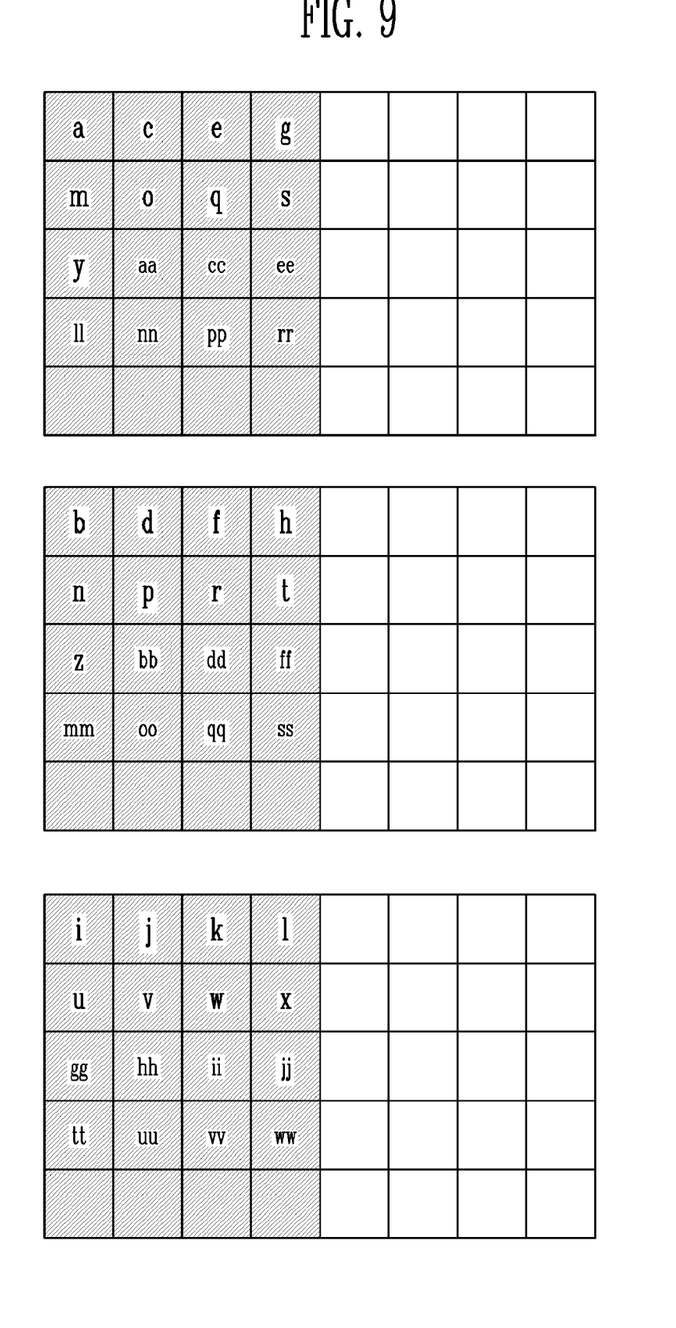
FIG. 9 illustrates the memory map of a buffer in which ½-pel interpolated values are stored according to an embodiment of the present invention.
Figure 10:
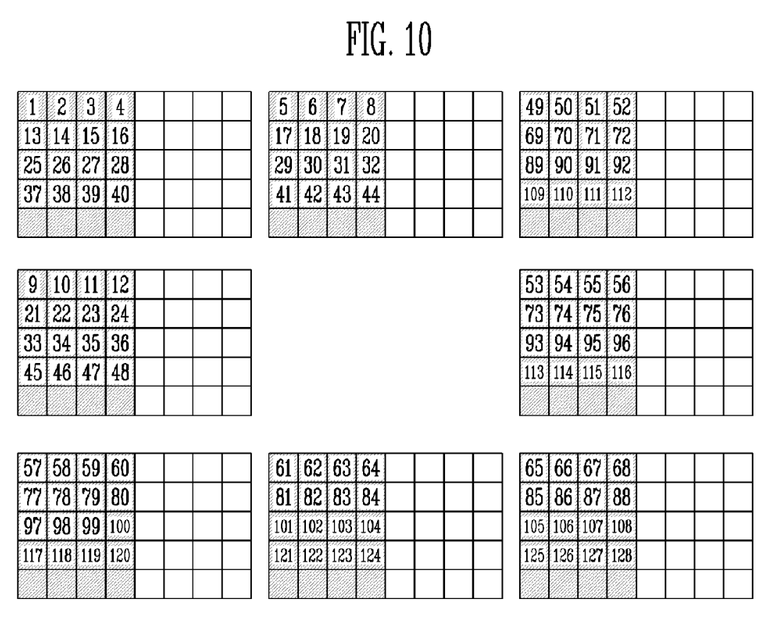
FIG. 10 illustrates the memory map of a buffer in which ¼-pel interpolated values are stored according to an embodiment of the present invention.

The symbols such as letters and numbers expressed at dots of the picture of FIG. 7 will be equally used and described in FIGS. 8, 9 and 10.

English upper-case letters 701 indicated in unit of four dots in FIG. 7 are 1-pel unit values. Further, English lower-case letters 703 are values determined by the ½-pel unit interpolation, and the numbers 705 are values determined by the ¼-pel unit interpolation.

FIGS. 8, 9 and 10 illustrate the memory map of a buffer in which 1-pel unit values, ½-pel unit interpolated values, and ¼-pel unit interpolated values according to an embodiment of the present invention.

Referring to FIG. 8, the stored values are values of English upper-case letters expressed in FIG. 7. The values are set for the 1-pel buffer by means of the memory map, and, only the 1-pel unit values are required when 1-pel unit motion estimation is calculated. Thus, only the 1-pel unit values of the 1-pel buffer can be referred to without referring to the search window of the reference frame all over, so that the operation of a processor can be very efficiently executed.

These 1-pel unit values can be stored in the 1-pel buffer, and are the total of 24×24 numbers based on the pixels determined by the following formula.

$$(X_{current\_MB}+X_{cme\_mv}-4+i, Y_{current\_MB}+Y_{cme\_mv}-4+j),$$

where i and j are the integers of 0 and 23, respectively.

$(X_{current\_MB}, Y_{current\_MB})$=the current macroblock coordinate, and $(X_{cme\_mv}, Y_{cme\_mv})$=the pixel location estimated in coarse-grained motion estimation (CME) process.

Referring to FIG. 9, the stored values are values of English lower-case letters stored in the case where 1-pel unit motion vector is assumed to be G. The values are set for the ½-pel buffer by means of the memory map, and, only the ½-pel unit interpolated values are required when ½-pel unit motion estimation is calculated. Thus, only the ½-pel unit values of ½-pel buffer can be referred to without referring to the search window of the reference frame all over, so that the operation of a processor can be very efficiently executed. In particular, when the costs are calculated in the ½-pel unit motion estimation, the costs according to values of a, b, c, i, j, m, n and o must be calculated because the 1-pel unit motion vector is G in FIG. 9. In this case, when there are three independent memory buffers, cost calculation including a, c, m and o, cost calculation including b and n, and cost calculation including i and j can be carried out at the same time.

These ½-pel unit interpolated values can be stored in the ½-pel buffer, and are 17×16, 16×17, and 17×17 numbers based on the pixels determined by the following formula.

The pixels stored in each buffer are as follows.

1) Pixels including a location shifted by the ½-pel unit in a leftward direction $$(X_{current\_MB}+X_{1pel\_mv}-0.5+i, Y_{current\_MB}+Y_{1pel\_mv}+j)$$

where i is the integer of 0 or 15, and j is the integer of 0 or 16, $(X_{current\_MB}, Y_{current\_MB})$=the current macroblock coordinate, and $(X_{1pel\_mv}, Y_{1pel\_mv})$=the motion vector calculated by the 1-pel estimator.

2) Pixels including a location shifted by the ½-pel unit in an upward direction $$(X_{current\_MB}+X_{1pel\_mv}+i, Y_{current\_MB}+Y_{1pel\_mv}-0.5+j)$$

where i is the integer of 0 or 16, and j is the integer of 0 or 15, $(X_{current\_MB}, Y_{current\_MB})$=the current macroblock coordinate, and $(X_{1pel\_mv}, Y_{1pel\_mv})$=the motion vector calculated by the 1-pel estimator.

3) Pixels including a locations shifted by the ½-pel unit in leftward and upward directions $$(X_{current\_MB}+X_{1pel\_mv}-0.5+i, Y_{current\_MB}+Y_{1pel\_mv}-0.5+j)$$

where i is the integer of 0 or 16, and j is the integer of 0 or 16, $(X_{current\_MB}, Y_{current\_MB})$=the current macroblock coordinate, and $(X_{1pel\_mv}, Y_{1pel\_mv})$=the motion vector calculated by the 1-pel estimator.

Referring to FIG. 10, the stored values are values of numbers stored in the case where ½-pel unit motion vector is assumed to be a. The values are set for the ¼-pel buffer by means of the memory map, and only the ¼-pel unit interpolated values set for the ¼-pel buffer are required when ¼-pel unit estimation is calculated. Thus, only the ¼-pel unit values can be referred to without referring to the search window of the reference frame all over, so that the operation of a processor can be very efficiently executed. In particular, when the costs are calculated in the ¼-pel unit motion estimation, the costs according to values of 1, 5, 49, 9, 53, 57, 61 and 65 must be calculated because the ½-pel unit motion vector is a in FIG. 10. In this case, when there are eight independent memory buffers including the respective dots, cost calculation including the respective dots can be simultaneously carried.

These ¼-pel unit interpolated values can be stored in the ¼-pel buffer, and are 16×16 numbers based on the pixels determined by the following formula.

1) Pixels including a location, a coordinate of which is (−¼, −¼) with respect to the motion vector determined by the ½-pel estimator $$(X_{current\_MB}+X_{1/2pel\_mv}-0.25+i, Y_{current\_MB}+Y_{1/2pel\_mv}-0.25+j)$$

where i and j are the integers of 0 and 15, respectively, $(X_{current\_MB}, Y_{current\_MB})$=the current macroblock coordinate, and $(X_{1/2pel\_mv}, Y_{1/2pel\_mv})$=the motion vector calculated by the ½-pel estimator.

2) Pixels including a location, a coordinate of which is (0, −¼) with respect to the motion vector determined by the ½-pel estimator $$(X_{current\_MB}+X_{1/2pel\_mv}+i, Y_{current\_MB}+Y_{1/2pel\_mv}-0.25+j)$$

where i and j are the integers of 0 and 15, respectively, $(X_{current\_MB}, Y_{current\_MB})$=the current macroblock coordinate, and $(X_{1/2pel\_mv}, Y_{1/2pel\_mv})$=the motion vector calculated by the ½-pel estimator.

3) Pixels including a location, a coordinate of which is (¼, −¼) with respect to the motion vector determined by the ½-pel estimator $$(X_{current\_MB}+X_{1/2pel\_mv}+0.25i, Y_{current\_MB}+Y_{1/2pel\_mv}-0.25+j)$$

where i and j are the integers of 0 and 15, respectively, $(X_{current\_MB}, Y_{current\_MB})$=the current macroblock coordinate, and $(X_{1/2pel\_mv}, Y_{1/2pel\_mv})$=the motion vector calculated by the ½-pel estimator.

4) Pixels including a location, a coordinate of which is (−¼, 0) with respect to the motion vector determined by the ½-pel estimator $$(X_{current\_MB}+X_{1/2pel\_mv}-0.25+i, Y_{current\_MB}+Y_{1/2pel\_mv}+j)$$

where i and j are the integers of 0 and 15, respectively, $(X_{current\_MB}, Y_{current\_MB})$=the current macroblock coordinate, and $(X_{1/2pel\_mv}, Y_{1/2pel\_mv})$=the motion vector calculated by the ½-pel estimator.

5) Pixels including a location, a coordinate of which is (¼, 0) with respect to the motion vector determined by the ½-pel estimator $$(X_{current\_MB}+X_{1/2pel\_mv}+0.25+i, Y_{current\_MB}+Y_{1/2pel\_mv}+j)$$

where i and j are the integers of 0 and 15, respectively, $(X_{current\_MB}, Y_{current\_MB})$=the current macroblock coordinate, and $(X_{1/2pel\_mv}, Y_{1/2pel\_mv})$=the motion vector calculated by the ½-pel estimator.

6) Pixels including a location, a coordinate of which is (−¼, ¼) with respect to the motion vector determined by the ½-pel estimator $$(X_{current\_MB}+X_{1/2pel\_mv}-0.25+i, Y_{current\_MB}+Y_{1/2pel\_mv}+0.25+j)$$

where i and j are the integers of 0 and 15, respectively, $(X_{current\_MB}, Y_{current\_MB})$=the current macroblock coordinate, and $(X_{1/2pel\_mv}, Y_{1/2pel\_mv})$=the motion vector calculated by the ½-pel estimator.

7) Pixels including a location, a coordinate of which is (0, ¼) with respect to the motion vector determined by the ½-pel estimator $$(X_{current\_MB}+X_{1/2pel\_mv}+i, Y_{current\_MB}+Y_{1/2pel\_mv}+0.25+j)$$

where i and j are the integers of 0 and 15, respectively, $(X_{current\_MB}, Y_{current\_MB})$=the current macroblock coordinate, and $(X_{1/2pel\_mv}, Y_{1/2pel\_mv})$=the motion vector calculated by the ½-pel estimator.

8) Pixels including a location, a coordinate of which is (¼, ¼) with respect to the motion vector determined by the ½-pel estimator $$(X_{current\_MB}+X_{1/2pel\_mv}+0.25+i, Y_{current\_MB}+Y_{1/2pel\_mv}+0.25+j)$$

where i and j are the integers of 0 and 15, respectively, $(X_{current\_MB}, Y_{current\_MB})$=the current macroblock coordinate, and $(X_{1/2pel\_mv}, Y_{1/2pel\_mv})$=the motion vector calculated by the ½-pel estimator.

According to the present invention, the motion estimation apparatus and method can be provided for moving picture coding.

Further, the motion estimation apparatus and method for moving picture coding can conduct 1-pel unit, ½-pel unit and ¼-pel unit motion estimation in a design considering a hierarchical motion estimation algorithm when motion estimation is conducted using ¼-pel unit interpolated pixels in the event of moving picture coding based on H.264, and efficient moving picture coding for the motion estimation.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A motion estimation apparatus for moving picture coding, comprising:

a one-standard-pixel (1-pel) buffer for storing 1-pel unit pixels using luminance signals of a reference frame, the stored 1-pel unit pixels corresponding to macroblocks of a current frame;

a 1-pel estimator for calculating 1-pel unit motion vectors and minimum costs in correspondence to the macroblocks of the current frame and the pixels stored in the 1-pel buffer;

a one-half-of-one-standard-pixel (½-pel) interpolator for performing ½-pel unit interpolation using the pixels stored in the 1-pel buffer and obtaining ½-pel unit interpolated pixels;

a ½-pel buffer for storing the ½-pel unit interpolated pixels;

a ½-pel estimator for calculating ½-pel unit motion vectors and minimum costs in correspondence to the pixels stored in the ½-pel buffer, the values calculated by the 1-pel estimator, and the macroblocks of the current frame;

a one-quarter-of-one-standard-pixel (¼-pel) interpolator for performing ¼-pel unit interpolation using the pixels stored in the ½-pel buffer and 1-pel buffer and obtaining ¼-pel unit interpolated pixels;

a ¼-pel buffer for storing the ¼-pel unit interpolated pixels; and a ¼-pel estimator for calculating ¼-pel unit motion vectors and minimum costs in correspondence to the pixels stored in the ¼-pel buffer, the values calculated by the ½-pel estimator, and the macroblocks of the current frame.

2. The motion estimation apparatus according to claim 1, wherein the 1-pel buffer includes a physical single memory, which stores 24×24 pixels.

3. The motion estimation apparatus according to claim 1, wherein
the ½-pel buffer includes physically separated three memories, which store 17×16, 16×17 and 17×17 pixels, respectively, and
the ½-pel buffer stores the ½-pel unit interpolated pixels among the pixels included in the 1-pel buffer in correspondence to the motion vectors determined by the 1-pel estimator.

4. The motion estimation apparatus according to claim 1, wherein
the ½-pel buffer includes physically separated three memories, and
the ½-pel buffer stores the ½-pel unit interpolated pixels among the pixels included in the 1-pel buffer in correspondence to the motion vectors determined by the 1-pel estimator.

5. The motion estimation apparatus according to claim 1, wherein
17×16 pixels, among the ½-pel unit interpolated pixels, are located on a search window from locations shifted by a ½-pel unit in a leftward direction with reference to the motion vectors, as reference motion vectors, determined by the 1-pel estimator at 1-pel unit intervals,
16×17 pixels, among the ½-pel unit interpolated pixels, are located on the search window from locations shifted by a ½-pel unit in an upward direction with reference to the reference motion vectors, and
17×17 pixels, among the ½-pel unit interpolated pixels, are located on the search window from locations shifted by a ½-pel unit in the leftward and upward directions with reference to the reference motion vectors.

6. The motion estimation apparatus according to claim 4, wherein the three memories include:
a memory storing 17×16 pixels, among the ½-pel unit interpolated pixels, from locations shifted by a ½-pel unit in a leftward direction with reference to pixels, as reference pixels, at which the motion vectors determined by the 1-pel estimator are occupied on a search window;
a memory storing 16×17 pixels, among the ½-pel unit interpolated pixels, from locations shifted by a ½-pel unit in an upward direction with reference to the reference pixels; and
a memory storing 17×17 pixels, among the ½-pel unit interpolated pixels, from locations shifted by a ½-pel unit in the leftward and upward directions with reference to the reference pixels.

7. The motion estimation apparatus according to claim 1, wherein
the ¼-pel buffer includes physically separated eight memories each of which stores respective 16×16 pixels, among the ¼-pel unit interpolated pixels, and
the ¼-pel buffer stores the ¼-pel unit interpolated pixels among the pixels included in the ½-pel buffer in correspondence to the motion vectors determined by the ½-pel estimator.

8. The motion estimation apparatus according to claim 1, wherein 16×16 pixels, among the ¼-pel unit interpolated pixels, are located on a search window at 1-pel unit intervals from each of eight contoured pixels included in a 3×3 block with reference to pixels at which the motion vectors determined by the ½-pel estimator are occupied on the search window.

9. The motion estimation apparatus according to claim 7, wherein
each of the eight memories stores the respective 16×16 pixels from respective one of eight contoured locations included in a 3×3 block set with reference to pixels at which the motion vectors determined by the ½-pel estimator are occupied on a search window, and
each of the eight memories stores values of the respective 16×16 pixels calculated from the respective one of the eight contoured locations.

10. A motion estimation method for moving picture coding, comprising:
storing by a motion estimation apparatus, one-standard-pixel (1-pel) unit pixels using luminance signals of a reference frame, the stored 1-pel unit pixels corresponding to macroblocks of a current frame;
calculating 1-pel unit motion vectors and minimum costs in correspondence to the stored 1-pel unit pixels and the macroblocks of the current frame;
performing one-half-of-one-standard-pixel (½-pel) unit interpolation using the stored 1-pel unit pixels, and obtaining ½-pel unit interpolated pixels;
storing the ½-pel unit interpolated pixels;
calculating ½-pel unit motion vectors and minimum costs in correspondence to the ½-pel unit interpolated pixels, the values of the 1-pel unit motion vectors and minimum costs calculated based on the 1-pel unit, and the macroblocks of the current frame;
performing one-quarter-of-one-standard-pixel (¼-pel) unit interpolation using the ½-pel unit interpolated pixels, and obtaining ¼-pel unit interpolated pixels;
storing the ¼-pel unit interpolated pixels; and
calculating ¼-pel unit motion vectors and minimum costs in correspondence to the ¼-pel unit interpolated pixels, the values of the ½-pel unit motion vectors and minimum costs calculated based on the ½-pel unit, and the macroblocks of the current frame.

11. The motion estimation method according to claim 10, further comprising:

locating 17×16 pixels, among the ½-pel unit interpolated pixels, on a search window from locations shifted by a ½-pel unit in a leftward direction with reference to the motion vectors, as reference motion vectors, determined by the 1-pel estimator at 1-pel unit intervals;

locating 16×17 pixels, among the ½-pel unit interpolated pixels, on the search window from locations shifted by a ½-pel unit in an upward direction with reference to the reference motion vectors; and locating 17×17 pixels, among the ½-pel unit interpolated pixels, on the search window from locations shifted by a ½-pel unit in the leftward and upward directions with reference to the reference motion vectors.

12. The motion estimation method according to claim 10, further comprising:

locating 16×16 pixels, among the ¼-pel unit interpolated pixels, on a search window at 1-pel unit intervals from each of contoured eight pixels included in a 3×3 block with reference to pixels at which the motion vectors determined by the ½-pel estimator are occupied on the search window.

13. The motion estimation method according to claim 10, further comprising:

storing 17×16 pixels, among the ½-pel unit interpolated pixels, from locations shifted by a ½-pel unit in a leftward direction with reference to pixels, as reference pixels, at which the motion vectors determined by the 1-pel estimator are occupied on a search window;

storing 16×17 pixels, among the ½-pel unit interpolated pixels, from locations shifted by a ½-pel unit in an upward direction with reference to the reference pixels; and storing 17×17 pixels, among the ½-pel unit interpolated pixels, from locations shifted by a ½-pel unit in the leftward and upward directions with reference to the reference pixels.

14. The motion estimation method according to claim 10, further comprising:

storing 16×16 pixels, among the ¼-pel unit interpolated pixels, from one of eight contoured locations included in a 3×3 block set with reference to pixels at which the motion vectors determined by the ½-pel estimator are occupied on a search window; and storing values of the 16×16 pixels calculated from the one of the eight contoured locations.

* * * * *